April 25, 1967      H. SHIRE      3,315,704

FLEXIBLE BELLOWS

Original Filed June 13, 1960

INVENTOR.
HAROLD SHIRE
BY
ATTORNEYS

United States Patent Office 3,315,704
Patented Apr. 25, 1967

3,315,704
FLEXIBLE BELLOWS
Harold Shire, Los Angeles, Calif., assignor to General Connectors Corporation, Burbank, Calif., a corporation of California
Continuation of application Ser. No. 35,599, June 13, 1960. This application June 17, 1963, Ser. No. 288,327
4 Claims. (Cl. 138—121)

The present invention relates to fireproof flexible bellows and is a continuation of my previously filed application for Fireproof Structural Materials, filed June 13, 1960, Ser. No. 35,599, now abandoned.

In the construction of aircraft and missiles, it is necessary to employ materials for ducts, duct joints and flexible bellows, which materials will serve to resist breakthrough in case any flaming should occur adjacent thereto. For example, in the case of ducts and duct joints which must conduct gases at extremely high temperatures, these gases may sometimes produce flaming which, if not confined, will cause a resultant complete destruction of the aircraft. In other words, the duct, duct joints or bellows must serve as a firewall, shielding the remainder of the structure from the flame.

Ducts, duct joints and bellows of the type under consideration must be designed so as to avoid a breakthrough as a result of the possible ignition of the gases therein, due to the heat generated internally, producing flaming. In considering the problem of internal heat, it must be kept in mind that some structural materials often used for ducting (e.g., silicone, rubber, neoprene and nitrile rubbers, phenolics and polyesters, to name only a few sealant materials, usually impregnated into fiberous glass, the various sealants being selected in accordance with their known qualities for a particular use) decompose at high temperatures and as a result such materials themselves produce combustible gases. In normal operation a duct or bellows may be expected to carry gas at a temperature of 200–700 degrees F. If a silicone rubber, for example, is used for the duct material, it will begin to decompose at approximately 800 degrees F., and at approximately 1200 degrees F., will burn.

Structural materials used heretofore for such purposes, as discussed above, have often presented a number of disadvantages. They usually have been of inordinately great weight. In many instances they have been excessively bulky, taking up too much space. Also, their cost has often been prohibitive. One material which has been so employed is stainless steel. The great cost, bulk and weight of this material are obvious. Complicated constructions have been devised to attempt to produce duct joints, particularly bellows-type duct joints, which would operate properly; i.e., have the necessary ability to be flexible, compressible, take elongation and be capable of being offset.

Another material which has been used for such purposes and for duct joints, is silicone-rubber-impregnated fiberous glass. This latter material may be made up in several plies. For example, in the construction of a bellows-type duct joint, three plies of silicone-rubber-impregnated fiberous glass might be employed. In this case, stainless steel rings are necessary to reinforce the joint against pressure and vacuum acting on the construction. Assuming a bellows-type joint having two convolutions, one stainless steel ring would be mounted on the exterior surface of the joint and between the convolutions, to resist internal pressure, and two rings would be mounted at the interior of the joint, being fitted within the two convolutions respectively, to resist vacuum. Each ply of silicone-rubber-impregnated fiberous glass might, for example, be of 1/32" thickness, while the stainless steel rings might be of approximately 1/16" in diameter each. A bellows-type joint so constructed operates satisfactorily in the sense that it has the necessary ability to be flexible, compressible, take elongation and be capable of being offset, but does not resist flaming, should this occur within the joint.

It is therefore an object of the invention to provide an improved fireproof bellows capable of withstanding a temperature of 2000 degrees F., such as produced by flaming, for approximately 15 minutes.

Another object of the present invention is to provide a fireproof bellows which is lightweight and thus particularly adapted for aircraft, missiles and other purposes.

Another object of the invention is to provide a fireproof bellows which combines the qualities of good flexibility and high heat resistance.

These and other objects of the invention will become apparent from the following description thereof, read in conjunction with the accompanying drawings, in which.

Figure 1:
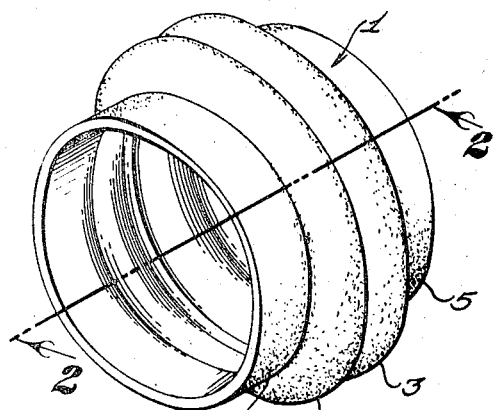
FIGURE 1 is a view in perspective of a bellows-type duct joint, embodying the present invention.

Referring to the drawings, and particularly to FIGURE 1, a flexible bellows-type duct joint 1 is shown. The duct joint 1 is provided with two convolutions 2 and 3. At its ends 4 and 5 the joint 1 is adapted for connection by any conventional means to the ends of ducts which are to be connected together.

Figure 2:
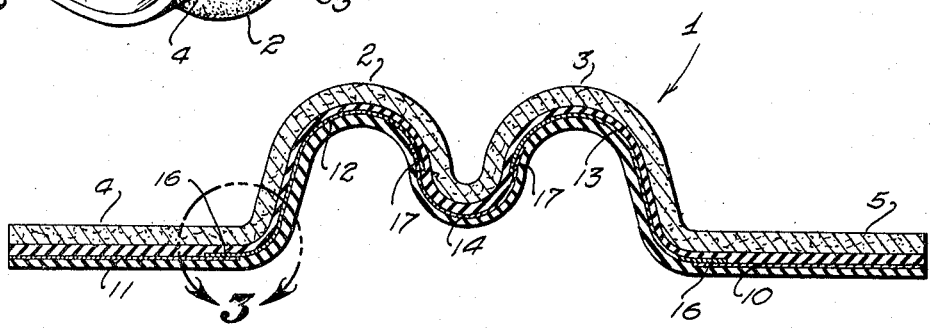
FIGURE 2 is an enlarged longitudinal section taken along the lines 2—2 of FIGURE 1.
Figure 3:
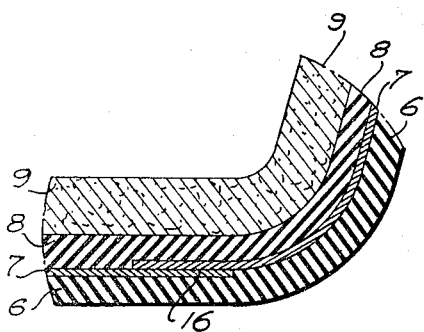
FIGURE 3 is a further enlarged sectional view of a portion of the wall of bellows-type duct joint taken within circle 3 of FIGURE 2.

As best seen in FIGURES 2 and 3, the duct joint 1 is constructed of four layers of material. The inner layer 6 is of silicone-rubber-impregnated fiberous glass (glass cloth). Adjacent the inner layer 6 is a layer 7 of stainless steel foil. Two outer layers 8 and 9 are provided, being composed of silicone-rubber-impregnated fiberous glass and aluminized asbestos cloth, respectively. The four layers 6, 7, 8 and 9 are adapted to efficiently conduct hot gases or liquids which pass through the duct joint 1, and at the same time, to serve as a firewall, in case flaming should occur within the duct joint 1.

The silicone-rubber-impregnated fiberous glass is of conventional structure, and the silicone rubber component functions as a sealant material. It combines the advantages of good wear resistance, great flexibility and lightness of weight. In addition, the silicone-rubber-impregnated fiberous glass has extremely high temperature resistance. However, other sealant materials mentioned heretofore may also be used, depending upon the use requirements. Among such materials are silicone-rubber used alone, neoprene and Teflon (trade name). However, if there is an internal flame, neoprene, silicone-rubber and Teflon will all ignite at a comparatively low temperature.

Each of the layers 6 and 8 of silicone-rubber-impregnated fiberous glass is preferably of a thickness of .013–.027", and this same thickness is preferred for this material in other embodiments of the invention hereinafter described.

The stainless steel foil making up the layer is in the form of strips having overlapped side edges, as may best be seen in FIGURE 2. Two such strips 10 and 11 correspond to the ends 4 and 5 of the duct joint 1, respectively. Two strips 12 and 13 are semi-toroidal rings with radially inwardly facing open sides and correspond to the convolutions 2 and 3, respectively; while a strip 14 is semi-toroidal with a radially outwardly facing open side and ring, corresponds to the depression 15 formed between the two convolutions. Axial overlapping of the side edges of the strips 10 and 11 with strips 12 and 13 is shown at 16; and radial overlapping of the strips 12 and 13 with the strip 14 is shown at 17.

The stainless steel foil making up the layer 7 serves as a direct barrier to flame. In addition, it acts to reflect back heat arising within the duct joint 1, thus reducing the heat transfer to the outer layers 8 and 9, and thereby retarding possible decomposition of said outer layers.

The stainless steel foil layer 7 because of the semi-toroidal cross section of the rings 12, 13, and 14 may provide a desired degree of rigidity to the structure, and thus eliminate the necessity of the use of stainless steel rings, such as have been formerly required for bellows-type joint seals. At the same time, flexibility of the duct joint is maintained as a result of the overlapped strip formation. Form retention will be maintained even under conditions of extreme heat, vacuum and pressure. It will be understood that in the case where flexibility is not critical, the stainless steel foil may be continuous and need not be in overlapped relation.

Other suitable high temperature resistant material may be employed for the layer 7 instead of stainless steel foil. It is preferred, in any case, that the layer 7 be of foil thickness that is in the range of .0001″–.003″.

As has been stated above, the outer layer 19 is of aluminized asbestos cloth. This material is of mesh-like structure, and it is believed that it serves, when hot gases pass therethrough, to lower the temperature thereof.

The aluminized asbestos cloth comprising layer 9 is preferably of a thickness of .02–.03″. The asbestos need not be aluminized, but might be treated with other reflective and heat-resistant material, such as silver. Any of a number of high-temperature-resistant woven or matted materials such as glass cloth, silica cloth or quartz matting might be substituted for the aluminized asbestos cloth.

It will be noted that the total thickness of the material illustrated is preferably in the range of .057–.087″. The respective layers are all bonded together in conventional manner.

*Example*

The duct joint 1 was tested by the application to the inner layer 16 of a direct flame, burning at a temperature of 2000 degrees F. The test was conducted for a period of 15 minutes and no breakthrough was observed.

As previously indicated, the silicone-rubber component of the layers 6 and 8 will begin to decompose at a temperature of about 800 degrees F., and will burn at approximately 1200 degrees F. Even after the silicone rubber has become decomposed, leaving two layers of fiberous glass, a flame barrier is still provided by said fiberous glass layers, the aluminized asbestos layer 9 and the stainless steel foil layer. In such case, the stainless steel foil become red hot with "hot spots" in the area of the outer ends of the convolutions 2 and 3 and the inner end of the depression 5.

Figure 4:
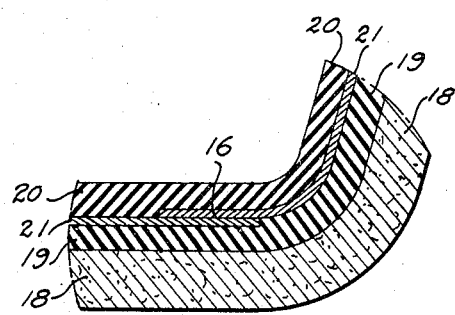
FIGURE 4 is an enlarged fragmentary sectional view similar to FIGURE 3, showing a modified construction.

Referring to FIGURE 4, a structural material similar to that of FIGURES 1–3 is shown. This material includes a layer of aluminized asbestos cloth 18 similar to the layer 9 of FIGURES 1, 2 and 3. However, the layer 18 serves as the *inner* layer of the material. Two outer layers 19 and 20 of sealant (i.e., silicone-rubber-impregnated fiberous glass) having therebetween a layer 25 of stainless steel foil, complete the structure. The material of FIGURE 4, like that of FIGURES 1–3, was found to provide a flame barrier.

It is believed that when hot gases or direct flame impinge on the internal layer 18 of aluminized asbestos cloth, said cloth provides a temperature-lowering effect with respect to any gases which might pass through said layer 19 due to its mesh construction. However, it is to be noted that at the same time there is no significant decomposition of the layer 18. It may be noted in this regard that asbestos cloth will begin to start degradation at about 800 degrees F., but will maintain good structural integrity up to a temperature of about 3000 degrees F. To the extent that heat is imparted to the first layer 19 of sealant-impregnated fiberous glass, some charring will occur. However, the structural integrity of the layer will be maintained. The stainless steel foil layer 21 will serve to reflect the heat back, and thus to maintain the outer sealant-impregnated fiberous glass layer 20 below its ignition point.

While FIGURES 3 and 4 show the aluminized asbestos cloth on the outer and inner sides respectively, it should be understood that the inner layer 18 may be added to the construction shown in FIGURE 3 so that both the inner and outer sides are covered with aluminized asbestos cloth, in which case the total thickness is preferably in the range of .067″–.117″.

The stainless steel foil layers impart structural rigidity and also serve as a physical barrier to the flame. While providing the advantage of having a metal present, each of the stainless steel foil layers, being of a range of thickness of about .0001–.003″, is much less bulky and of much lighter weight than conventional stainless steel used for similar purposes, and which has conventionally been in the order of a thickness of .01″ or greater. Also, in the case of bellows-type duct joints, the presence of the stainless steel foil layer may eliminate the need for supporting stainless steel rings, such as have been used heretofore in the art. Here again, not only is there a weight advantage gained, but the gas turbulence which may be caused by such rings internally in the duct is avoided.

It will be realized that the basic materials of the invention (i.e., a sealant-impregnated fiberglass material, a metal foil, either continuous or overlapped, and a high-temperature-resistant material of "sieve" structure) may be combined to provide fireproof structural materials in ways other than those here specifically described. For example, different combinations of layers than those here shown might be employed. Or, several layers of a given material, or a layer of the same material, but of greater thickness might be employed in place of any of the layers of these structural materials disclosed.

What I claim is:
1. A fireproof bellows, comprising:
   (a) a tubular barrier wall formed of stainless steel foil, the ends being cylindrical for connection to pipe sections and the midportion being annularly corrugated;
   (b) a covering on both the inner and outer surfaces of said barrier wall, said covering formed of silicone rubber impregnated glass cloth;
   (c) and a heat insulating sheath of aluminized asbestos overlying at least one of said coverings, said sheath having a reflective surface.
2. A fireproof bellows as set forth in claim 1, wherein:
   (a) said barrier wall comprising a plurality of axially overlapping semi-toroidal rings.
3. A fire resistant bellows, comprising:
   (a) a tubular barrier wall including a series of flexible semi-toroidal stainless steel rings, having alternately radially outwardly and radially inwardly facing open sides, the margins of said rings being disposed in radially overlapping relation;
   (b) and a high temperature resistant covering on both sides of said barrier wall.
4. A fire resistant bellows, comprising:
   (a) a tubular barrier wall including a series of flexible semi-toroidal stainless steel rings, having alternately radially outwardly and radially inwardly facing open sides, the margins of said rings being disposed in radially overlapping relation;
   (b) a covering for the inner and outer surfaces of said barrier wall, said covering formed of a high temperature resistant material, impregnated with a high temperature sealant;

(c) and a heat insulating sheath overlying at least one of said coverings.

References Cited by the Examiner

UNITED STATES PATENTS

| | | | |
|---|---|---|---|
| 725,824 | 4/1903 | Clark | 230—165 X |
| 2,514,905 | 7/1950 | Solero | 138—138 X |
| 2,525,070 | 10/1950 | Greenwald et al. | 156—184 |
| 2,561,891 | 7/1951 | Tucker | 161—403 X |
| 2,801,427 | 8/1957 | Crocker | 5—354 |
| 2,911,038 | 11/1959 | Frommelt | 160—351 |

LAVERNE D. GEIGER, *Primary Examiner.*

L. HOUCK, *Assistant Examiner.*